(12) United States Patent
Lehner et al.

(10) Patent No.: US 8,418,995 B2
(45) Date of Patent: Apr. 16, 2013

(54) SANITARY FITTING WITH LIMITATION OF WATER FLOW

(75) Inventors: Michael Lehner, Granichen (CH); Susanne Keller, Bottstein (CH)

(73) Assignee: KWC AG, Unterkulm (CH)

( * ) Notice: Subject to any disclaimer, the term of this patent is extended or adjusted under 35 U.S.C. 154(b) by 374 days.

(21) Appl. No.: 12/659,229

(22) Filed: Mar. 1, 2010

(65) Prior Publication Data
US 2010/0224812 A1 Sep. 9, 2010

(30) Foreign Application Priority Data

Mar. 4, 2009 (EP) ..................................... 09003073

(51) Int. Cl.
*F16K 31/44* (2006.01)
(52) U.S. Cl.
USPC .......... 251/235; 251/238; 251/243; 251/288; 137/625.17; 137/625.4; 137/636.3
(58) Field of Classification Search .................. 251/231, 251/285, 288, 234–236, 232, 233, 237, 238, 251/242, 243; 137/607, 625.17, 625.4, 625.41, 137/636.1–636.4; 4/695
See application file for complete search history.

(56) References Cited

U.S. PATENT DOCUMENTS

| 3,554,232 A * | 1/1971 | Kappel et al. ............. 137/625.17 |
| 3,915,195 A * | 10/1975 | Manoogian et al. ...... 137/625.41 |
| 4,301,836 A * | 11/1981 | Hunziker ................... 137/625.4 |
| 4,610,272 A | 9/1986 | Gottwald et al. |
| 4,651,774 A * | 3/1987 | Oberdorfer .............. 137/625.17 |
| 4,653,535 A | 3/1987 | Bergmann |
| 4,750,519 A * | 6/1988 | Chao-Chun .............. 137/625.17 |
| 5,082,023 A | 1/1992 | D'Alayer de Costemore d'Arc |
| 5,363,880 A | 11/1994 | Hsieh |
| 7,850,323 B2 * | 12/2010 | Keiper et al. ................... 362/96 |

FOREIGN PATENT DOCUMENTS

| EP | 0 140 275 A2 | 5/1985 |
| EP | 0 426 639 B1 | 5/1991 |
| EP | 0 643 246 A1 | 3/1995 |
| EP | 1 055 781 A2 | 11/2000 |
| EP | 1 450 088 A2 | 8/2004 |
| GB | 2 144 521 A | 3/1985 |

OTHER PUBLICATIONS

European Search Report for European Application No. EP 09 00 3073 searched Jul. 24, 2009 (with concise explanation).

* cited by examiner

*Primary Examiner* — John K Fristoe, Jr.
*Assistant Examiner* — Marina Tietjen
(74) *Attorney, Agent, or Firm* — Oliff & Berridge, PLC

(57) ABSTRACT

A sanitary fitting includes a fitting housing; a cartridge disposed in a recess of the fitting housing, the cartridge having a control arm which, for an adjustment of a temperature of water, is rotatable about a rotation axis of the cartridge and, for an adjustment of water flow, is pivotable about a pivot axis running at right angles to the rotation axis, between an off setting and a maximum setting; an actuating lever disposed on the control arm, the actuating lever rotating and pivoting the control arm; and a cap covering the recess and the cartridge, the cap limiting a pivot motion of the actuating lever, and thus of the control arm, between the off setting and the maximum setting in an economy setting.

9 Claims, 6 Drawing Sheets

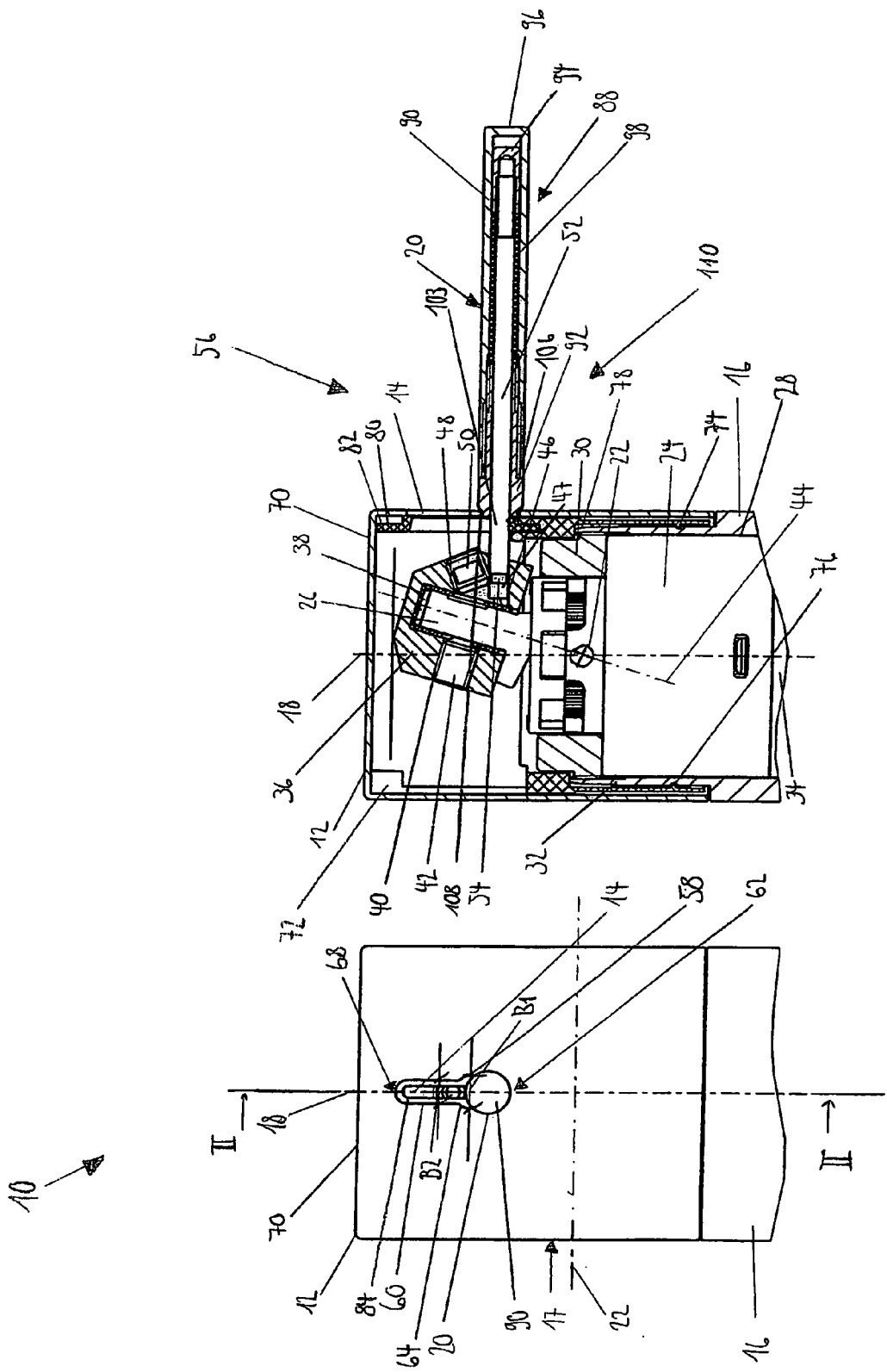

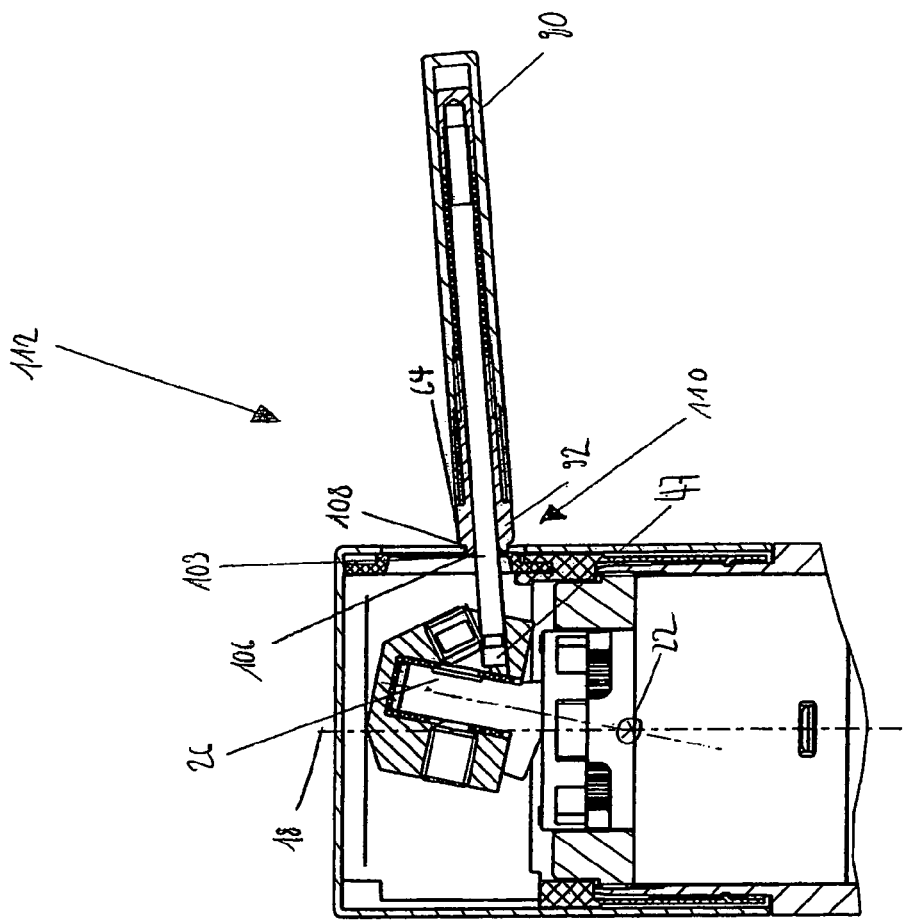
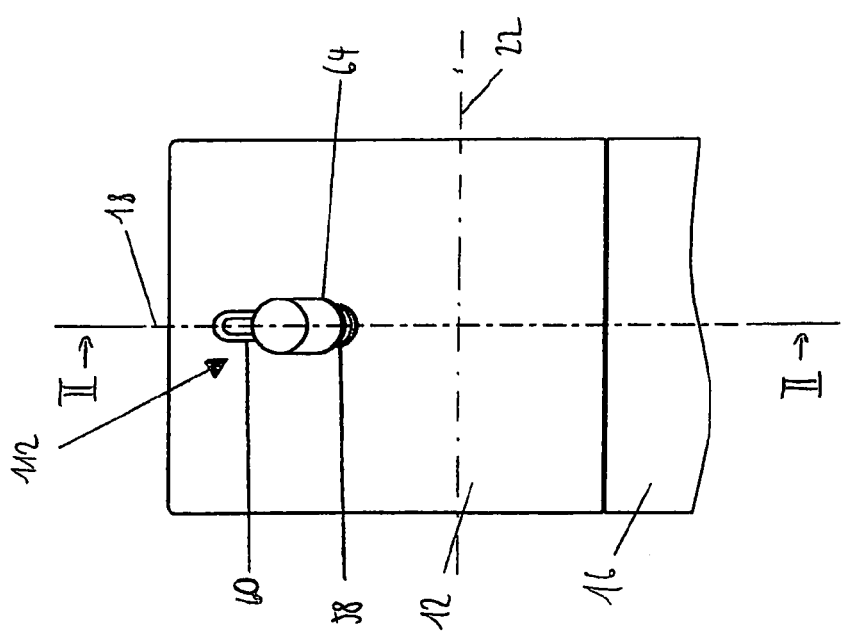

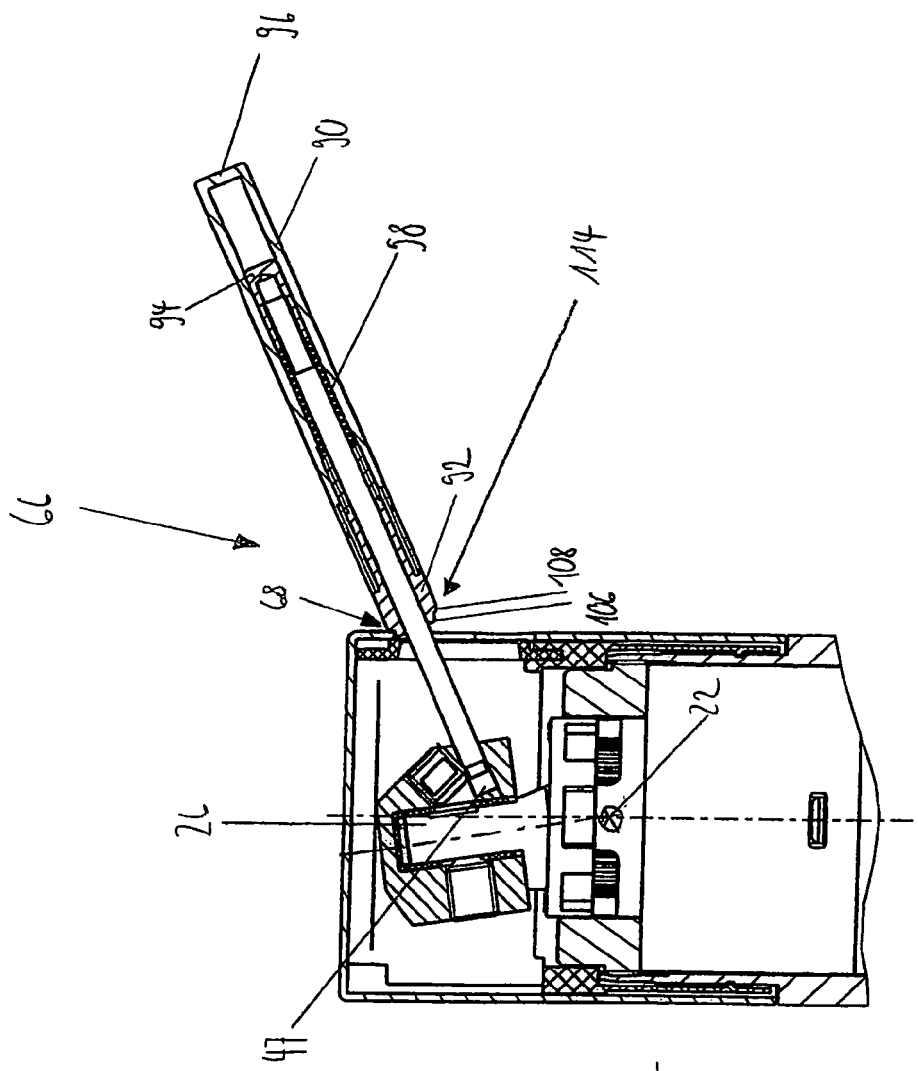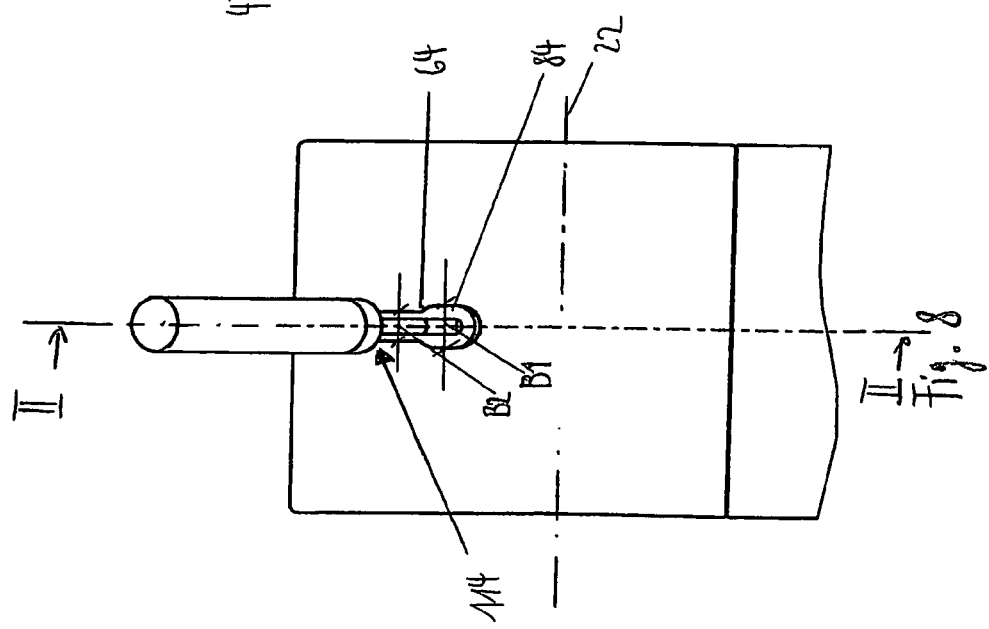

SANITARY FITTING WITH LIMITATION OF WATER FLOW

CROSS-REFERENCE TO RELATED APPLICATION

This application claims priority from European Patent Application No. EP 09 003 073.5, filed Mar. 4, 2009, the entire disclosure of which is incorporated herein by reference thereto.

BACKGROUND

The present invention relates to a sanitary fitting.

A sanitary fitting of this type is known from EP 1 450 088 A. Fastened to a control arm of a cartridge disposed in a recess of a fitting housing is a cap, from which there protrudes an S-shaped actuating lever, configured in one piece therewith. This has a hinge joint, so that the free end portion of the actuating lever forms an auxiliary lever on which there is arranged an adjusting screw. If the auxiliary lever is pivoted in the off setting of the actuating lever, the adjusting screw comes to bear against the fitting housing, whereby the cap, and hence the control arm of the cartridge, is pivoted into an economy setting. Through actuation of that part of the actuating lever which faces the hinge joint of the cap, the control arm of the cartridge can be pivoted from the economy setting and from the off setting directly into the maximum setting, in order to adjust the maximum water flow.

A further sanitary fitting of this type is known from EP 1 055 781 A. Here too, a cap with an actuating lever protruding therefrom is fastened to the control arm of a cartridge, which cartridge is disposed in a recess of the fitting housing. The cap is passed through by an auxiliary lever, which, in order to limit the pivot motion into the economy setting, has to be drawn nearer to the actuating lever. The auxiliary lever, in the economy setting, is here supported against a top edge of a cover ring of the cartridge. The release of the auxiliary lever allows the actuating lever to be pivoted into the maximum setting.

SUMMARY

One object of the present invention is to provide a sanitary fitting of the generic type, which can be easily and safely operated in a user-friendly manner.

According to the invention, a cap covering a cartridge and a recess of a fitting housing, in which recess the cartridge is disposed, is arranged or mounted on the fitting housing in such a way that it is rotatable about the rotation axis of the cartridge but cannot be pivoted about a pivot axis running at right angles to the rotation axis. An actuating lever for actuating the control arm of the cartridge is disposed on this control arm and is guided through a passage of the cap. That part of the actuating lever which protrudes over the cap can thus be actuated by the person using the fitting. The passage is configured in the shape of a long hole and has a step assigned to an economy setting. If the actuating lever is in a limit setting, its pivot motion, starting from an off setting in which the cartridge prevents the flow of water through the sanitary fitting, in the direction of a maximum setting in which the cartridge allows the maximum water flow, is in an economy setting limited. This is predefined by the step of the passage, in the economy setting of the actuating lever the water flow being less than the maximum water flow; for example, the water flow in the economy setting amounts to about 30-40% of the maximum water flow. If, on the other hand, the actuating lever is shifted into its release setting, its pivot motion in the direction of the maximum setting is unrestricted.

Preferably, the actuating lever is subjected to a force acting in the direction of the limit setting, so that it can be shifted into the release setting only by surmounting of this force by the person using the fitting. The economy setting is thus only surmountable if the actuating lever is deliberately shifted into the release setting.

Since the cap is mounted on the fitting housing rotatably about the rotation axis, when the actuating lever is rotated about the rotation axis, it can co-rotate in order to adjust the water temperature.

Preferably, the longitudinal direction of the long-hole-like passage runs in a plane containing the rotation axis.

Preferably, the actuating lever can be brought out of its limit setting into the release setting by pulling, in a direction radially outward with respect to the rotation axis. It is also conceivable, however, to configure the actuating lever in such a way that, by rotation about its axis or by pressing, it is shifted radially up to the rotation axis, from the limit setting into the release setting.

BRIEF DESCRIPTION OF THE DRAWINGS

The invention will be explained with reference to an exemplary embodiment which is illustrated in the drawings in which, purely schematically:

FIG. 1 shows a view of a sanitary fitting which has a fitting housing, a cap with a passage and an actuating lever in an off setting;

FIG. 2 shows a longitudinal section along the line II-II through the sanitary fitting represented in FIG. 1, having a cartridge which has a control arm to which the actuating lever in the off setting is fastened;

FIG. 6 shows a view of the sanitary fitting from FIG. 1, with the actuating lever pivoted into an economy setting;

FIG. 7 shows a longitudinal section along the line II-II through the sanitary fitting represented in FIG. 6, FIG. 8 shows a view of the sanitary fitting from FIG. 1, with the actuating lever pivoted into a maximum setting; and FIG. 9 shows a longitudinal section along the line II-II through the sanitary fitting represented in FIG. 8.

DETAILED DESCRIPTION OF EMBODIMENTS

Figure 3:
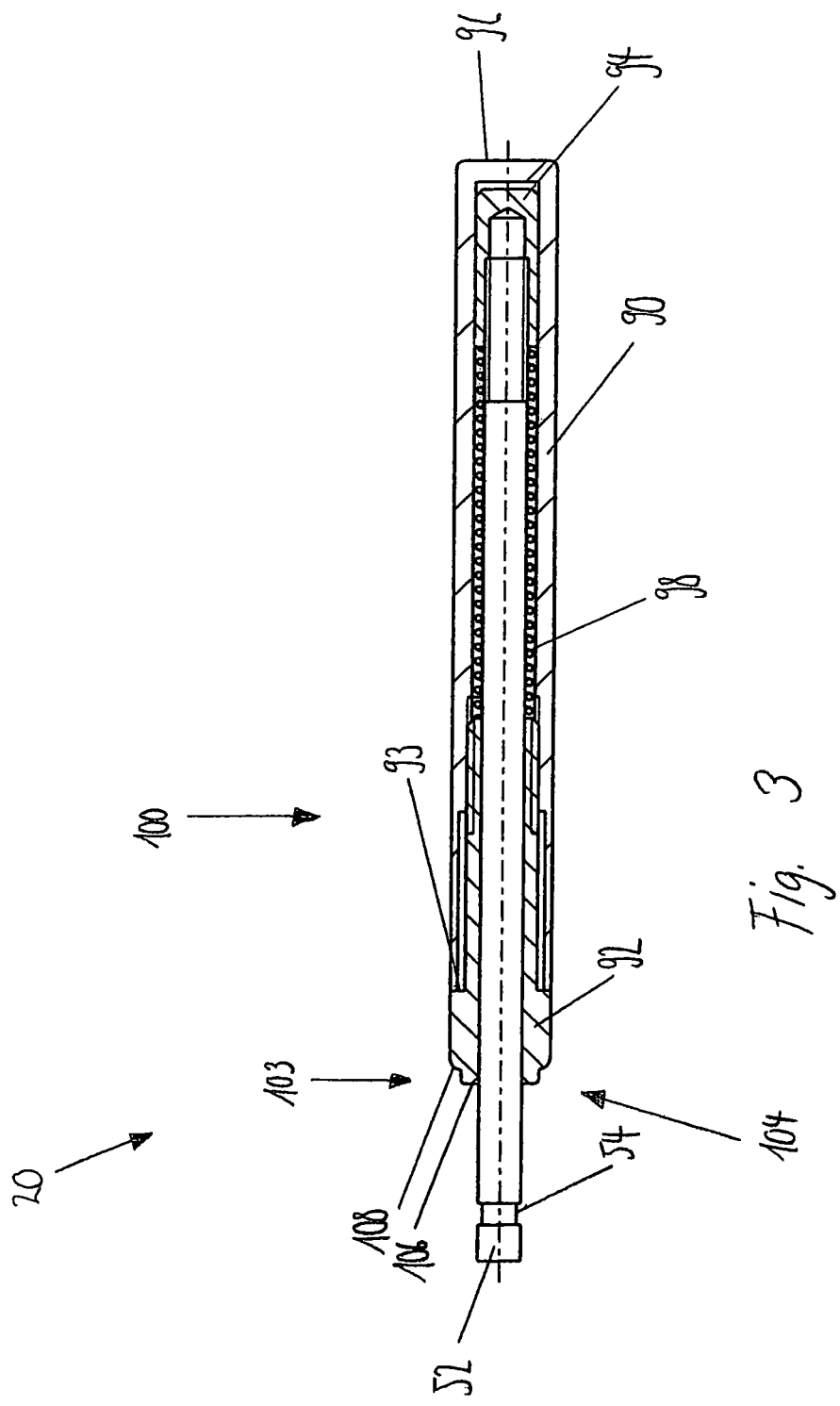
FIG. 3 shows a longitudinal section through the actuating lever in a first end position.

FIG. 1 shows in projection an upper part of a sanitary fitting 10, which has a cap 12, having a passage 14 of long-hole-like configuration, and a fitting housing 16, which is fastened in a known manner to a support, for example to a wash stand. The cap 12 has a circular-cylindrical casing portion 17, in which the long-hole-like passage 14 is disposed, the longitudinal axis of the passage 14 lying in one plane with a rotation axis 18 defined by the fitting housing 16 and running centrally through the sanitary fitting 10. Through the passage 14, approximately at right angles to the rotation axis 18, an actuating lever 20 emerges from inside the cap 12. The cap 12 is mounted on the fitting housing 16 rotatably about a longitudinal axis, i.e. about the rotation axis 18. The cap 12 can co-rotate with the actuating lever 20 and the actuating lever 20 can additionally, limited by the long-hole like passage 14, be pivoted about a pivot axis 22.

FIG. 2 shows a longitudinal section through the sanitary fitting 10. Inside the fitting housing 16 is disposed a cartridge 24, which has a control arm 26. The control arm 26 is mounted in the cartridge 24 in a known manner such that it is rotatable about its rotation axis coincident with the rotation axis 18 and is pivotable about the pivot axis 22 running at right angles thereto. By means of the actuating lever 20, or a person operating the actuating lever 20, the control arm 26 can be rotated about the rotation axis 18 for adjustment of the water temperature, or can be pivoted about the pivot axis 22 for adjustment of the water volume.

As generally known, the cartridge 24 is disposed in a recess 28 in the fitting housing 16 and, by means of a screwed-in retaining ring 30, which has an external thread and is screwed onto an internally threaded protruding portion 32 of the fitting housing 16, is thus tightly clamped to a false bottom 34.

For the supply of hot and cold water to the cartridge 24 and for the evacuation of the mixed water from the cartridge 24 to an outlet pipe (not shown) of the sanitary fitting 10, the false bottom 34 and the bottom of the cartridge 24 have in a known manner the appropriate openings.

A fastening body 36, which has a recess, is disposed inside the cap 12 on a free end portion of the control arm 26. Between the fastening body 36 and the control arm 26 is found an electrically insulating sleeve 38, which prevents a galvanic connection between the control arm 26 and the fastening body 36. The fastening body 36 is clamped to the control arm 26 by means of a first headless screw 42 screwed into a first threaded bore 40, in particular a hexagon socket set screw, the first threaded bore 40 being configured on the side facing away from the passage 14. The first threaded bore 40 is arranged radially at right angles to a longitudinal axis 44 of the control arm 26. On that side of the fastening body 36 which lies opposite the first threaded bore 40, said fastening body has a blind-hole bore 46. The blind-hole bore 46 serves to receive a fastening portion 47 of the actuating lever 20. At an acute angle to this blind-hole bore 46 there is configured in the fastening body 36 a second threaded bore 48, in which a second headless screw 50, in particular a hexagon socket set screw, is inserted.

The actuating lever 20 has an actuating rod 52, which passes through the passage 14 and has in the fastening portion 47 a peripherally running groove 54, which is open radially outward. The actuating rod 52 is inserted in the blind-hole bore 46 and is clamped in the fastening body 36 by means of the second headless screw 50, which engages in the groove 54. The actuating lever 20 is fitted in an off setting 56 (see FIG. 2), indeed in this off setting 56 can be passed through from outside the cap 12, through the passage 14, by means of a tool, for example, so that the second headless screw 50 can be locked.

As can be inferred, in particular, from FIG. 1, the passage 14 has a first portion 58 and a second portion 60. The first portion 58 extends from a lower end 62, assigned to the off setting 56, up to a step 64, and has a first width B1, measured in the peripheral direction of the cap 12. The second portion 60, extending from the step 64 up to an upper end 68, assigned to a maximum setting 66, of the passage 14, has a second width B2, the first width B1 being larger than the second width B2. The step 64 serves to limit the pivot motion of the actuating lever 20, so that the water flow is limited to, for example, 30-40% of the maximum water flow.

The cap 12 has a lid 70, which integrally connects to the casing portion 17 and is arranged at right angles to the rotation axis 18, and said cap is arranged on the protruding portion 32 of the fitting housing 10 by means of a recessed fastening frame 72, which can be formed from plastic and is fixedly connected, for example bonded, to the inner region of the cap 12. A bead 74, which is formed onto the fastening frame 72, protrudes radially inward with respect to the rotation axis 18 and runs in the peripheral direction, hereupon engages in a radially outwardly open groove 76 running peripherally on the protruding portion 32 of the fitting housing 16, and thereby secures the fastening frame 72, and hence the cap 14, on the fitting housing 16 rotatably about the rotation axis 18. The fastening frame 72 is chosen such that, between this same and the protruding portion 32 of the fitting housing 16, a plain bearing is configured, which allows the cap 12 to rotate about the rotation axis 18. The protruding portion 32 has in an upper, free end region a taper 78, which facilitates the application of the fastening frame 72 and the cap 12.

In the region of the passage 14, the cap 12 has an inner seal 80. The seal 80 has a basic body 82 and protruding lips 84, both elements being formed from elastic material, for example rubber. The basic body 82 has a passage consistent with the passage 14 of the cap 12 and is fastened to the cap 12. The lips 84 are configured on that side of the basic body 82 which faces the passage 14 and extend along the passage 14 of the cap 12. The seal 80 serves to partially close off the passage 14 and helps to prevent the penetration of water and dirt.

Figure 4:
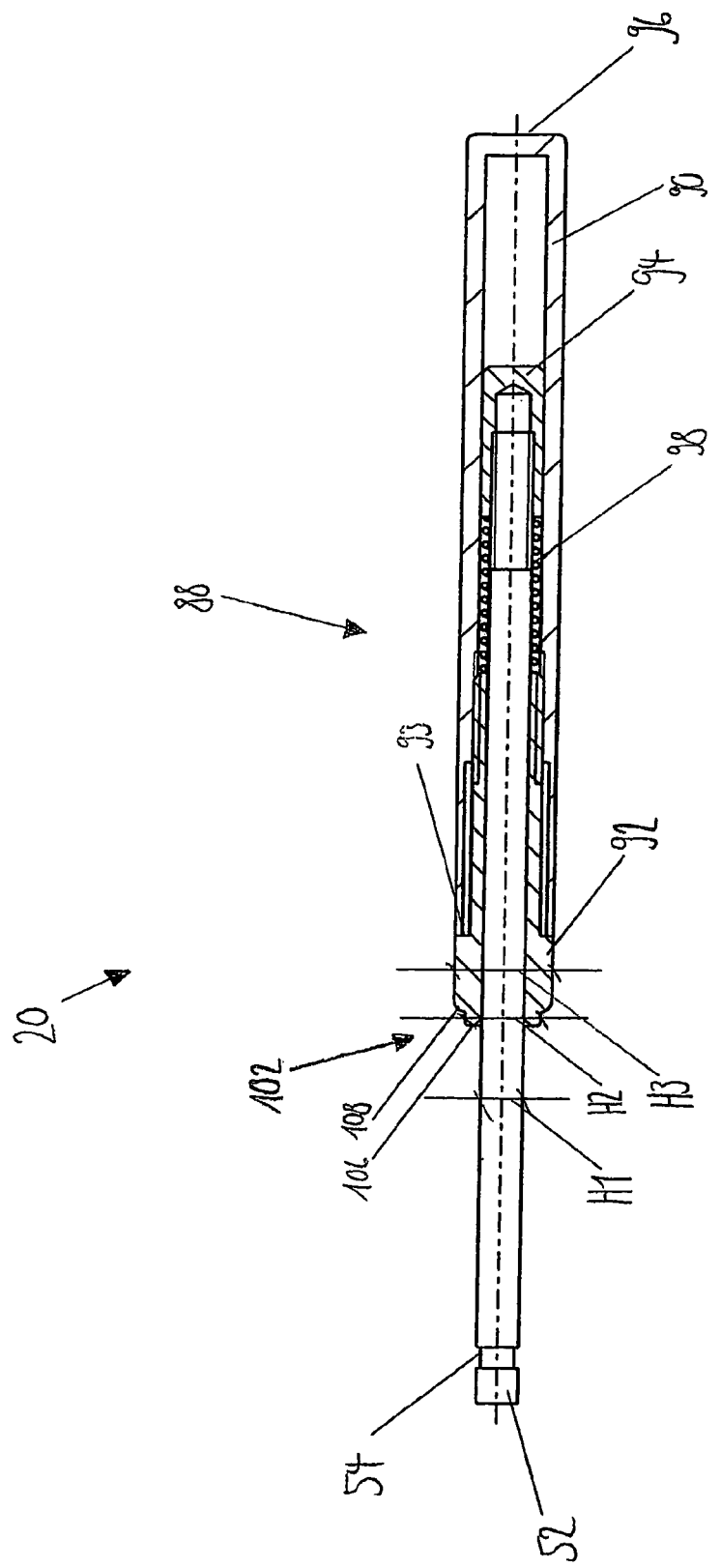
FIG. 4 shows a longitudinal section through the actuating lever in a second end position.
Figure 5:
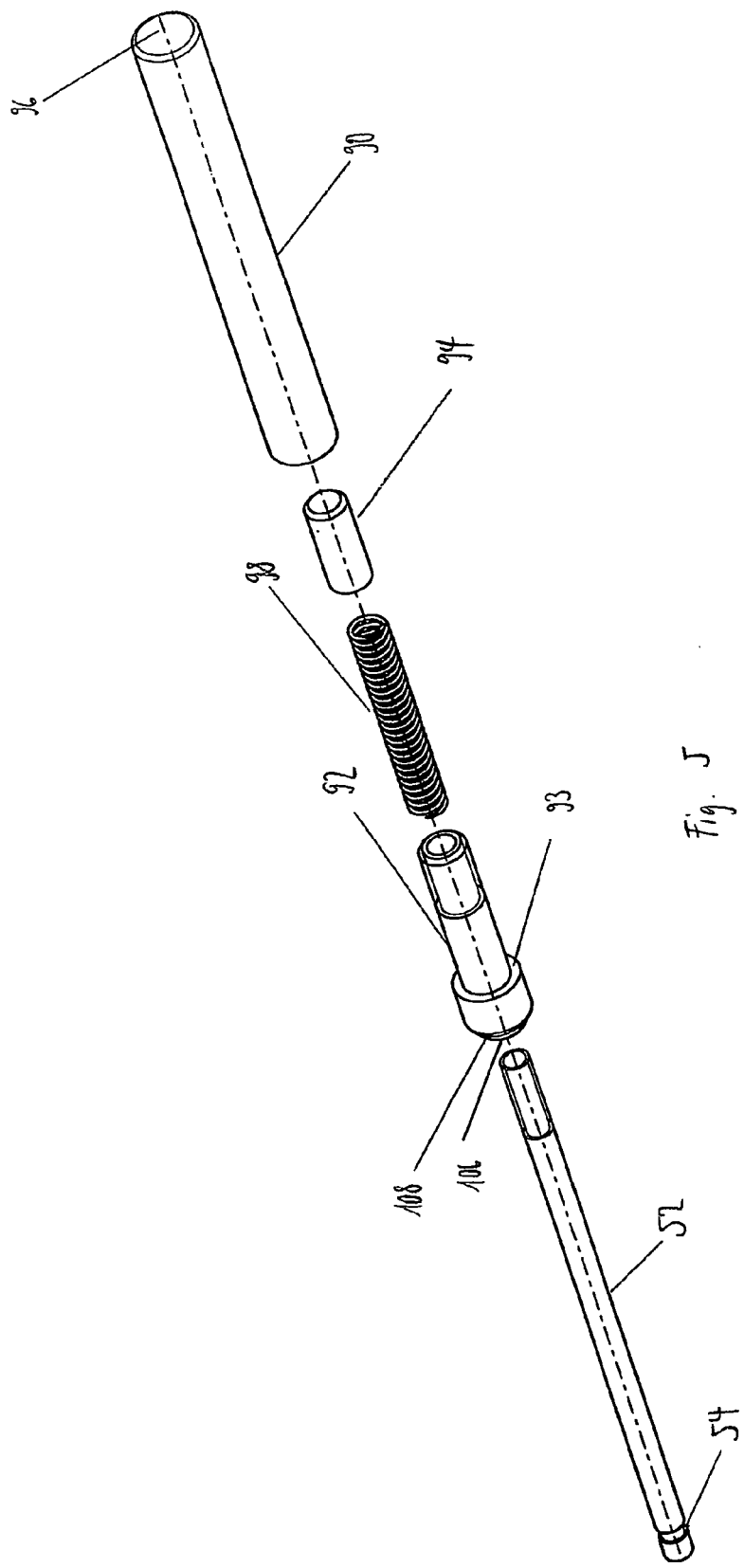
FIG. 5 shows a perspective exploded drawing of the actuating lever.

As can be seen from FIGS. 3 to 5, an actuating sleeve 88 is mounted on the actuating rod 52 displaceably in the longitudinal direction. The actuating sleeve 88 has an end sleeve 90 and a tubular element 92. The tubular element 92 is screwed into the end sleeve 90 up to a stop 93 by means of an external thread configured on that end of the tubular element 92 which faces away from the groove 54, said end sleeve, on the end facing the groove 54, having an internal thread. Within the end sleeve 90, at that end of the actuating rod 52 which faces away from the groove 54, a spring cage 94 is screwed by means of an internal thread onto the end region of the actuating rod 52, which has an external thread. The end sleeve 90, at the end facing away from the groove 54, is closed with a base portion 96. Between the actuating rod 52 and the end sleeve 90, a spring 98 is arranged, which is supported by one end against the spring cage 94 and by another end against the tubular element 92.

Due to this structure, the actuating sleeve 88 can be moved into the end positions shown in FIGS. 3 and 4. FIG. 3 shows the actuating lever 20 in a first end position 100, the actuating sleeve 88 almost touching the spring cage 94 with a base portion 96 adjoining the opposite side of the groove 54. FIG. 4 shows the actuating lever 20 in a second end position 102. The actuating sleeve 88 is retracted in the direction away from the groove 54 and a longer portion of the actuating rod 52 is freed. This second end position 102 can be achieved by the application of an external force away from the groove 54, for example by a person using the sanitary fitting 10. In the second end position 102, the actuating lever 20 is fitted. The fastening portion 47 can here be inserted through the passage 14 into the blind-hole bore 46 of the fastening body 36, after which the actuating rod 52 can be clamped in place by means of the second headless screw 50. Next, the spring 98 can be untensioned and a portion of the tubular element 102, which portion faces the groove 54, starts to cooperate with the passage 14.

The actuating rod 52, in a portion 103 which is intended to cooperate with the passage 14 and is located on a cap-side sleeve end 104, has a first lever width H1. On its end facing the groove 54, the tubular element 102 has an end face 106. Extending from this end face 106 to a shoulder 108 is a cylindrical region having a second lever width H2. Adjoining the shoulder 108 there extends a further cylindrical region, having a third lever width H3 corresponding to the outer diameter of the actuating sleeve 88, the first lever width H1 being smaller than the second lever width H2 and this, in turn, being smaller than the third lever width H3. The edges of the end face 106 and of the shoulder 108 are rounded in cross section in order to prevent damage to the cap 12.

As described in connection with FIGS. 1 and 2, the first width B1 is larger than the second lever width H2 but smaller than the third lever width H3, and the second width B2 is larger than the first lever width H1 but smaller than the second lever width H2.

FIGS. 1 and 2 and 6 to 9 show the actuating lever 20 disposed on the sanitary fitting 10. If the actuating sleeve 88 is in a limit setting 110, as shown in FIGS. 1 and 2 and 6 and 7, then a free choice can be made between an economy setting 112 and the off setting 56. In the portion 103 which is intended to cooperate with the passage 14, the actuating lever 20 or the actuating sleeve 88, in the limit setting 110, has the second lever width H2. The actuating sleeve 88 or the tubular element 102 here engages in the first portion 58 of the passage 14 up to the shoulder 108 and can be moved only up to the step 64. The shoulder 108 or the third lever width H3 prevents the actuating lever 20 from penetrating too deeply into the passage 14.

FIGS. 6 and 7 show the actuating lever 20 arranged in the economy setting 112, with the actuating sleeve 88 in a limit setting 110. In the economy setting 112, only a limited water flow, for example 30-40% of the maximum water flow, is released. When the sanitary fitting 10 is used by a person, the maximum water flow is thereby prevented, from the very start of the water delivery, from being immediately released.

FIGS. 8 and 9 show the actuating lever 20 arranged in a maximum setting 66. In order to move the actuating lever 20 into the maximum setting 66, the actuating sleeve 88 is pulled out by a force applied, for example, by a person using the sanitary fitting and shifted into a release setting 114. In the release setting 114, in the portion 103 which is intended to cooperate with the passage 14, now only the actuating rod 52, with the first lever width H1, engages in the second portion 60 of the passage 14. The end face 106 or the second lever width H2 here prevents the actuating sleeve 88 from being able to penetrate into the passage 14. The actuating lever 20 can hence be pivoted beyond the step 64 into the maximum setting 66. If the actuating sleeve 88 is in the release setting 114, then the actuating lever 20 can be pivoted according to choice between the off setting 56, the economy setting 112 and the maximum setting 66.

In the event of a departure from the maximum setting 66, the actuating lever 20 has only to be pushed downward in the direction of the off setting 56. The actuating lever 20 hereupon slides beyond the step 64 and a restoring force of the spring 98 pushes the actuating sleeve 88 back again into the limit setting 110.

The sanitary fitting 10 thus has the function of limiting the water flow with the aid of the step 64 and thus of releasing the maximum water flow only in the event of a deliberate manipulation, in the present case by application of an axial tensile force to the actuating sleeve 88. If the sanitary fitting 10, starting from the off setting 56, is operated without application of the tensile force, then it is not possible to pivot the actuating lever 20 into the maximum setting 66, the range of pivot being limited by the economy setting 112.

By means of the sanitary fitting 10, it is possible to save water, whether in the private or public sector.

The actuating lever 20 can also be configured such that the actuating sleeve 88 can be moved into the release setting 112 by means of a rotary motion about its longitudinal axis, whereafter the actuating lever 20 can be pivoted into the maximum setting 66. In order to enable this, the actuating lever 20 or the actuating sleeve 88 cannot be configured in the shape of a rectangle, flattened on two opposite sides. The actuating lever 20 hence has two widths, one being larger than the other. In the event of a possible rotary motion about the longitudinal axis of the actuating lever 20, the width which cooperates with the passage 14 can thus be chosen by the person using the sanitary fitting (10). Instead of a described narrowing by means of the end face 106 or the shoulder 108, the narrowing is obtained by two different-sized widths of the actuating lever 20, corresponding to the lever widths H1 and H2.

It is also conceivable to shift the actuating lever 20 or the actuating sleeve 88 into the release setting 114 by means of a compressive force along the longitudinal axis of the actuating lever 20. In this case, the actuating sleeve 88 would be disposed within the cap 12, which would correspond to a kinematic reversal.

What is claimed is:

1. A sanitary fitting comprising:
   a fitting housing;
   a cartridge disposed in a recess of the fitting housing, the cartridge having a control arm which, for an adjustment of a temperature of water, is rotatable about a rotation axis of the cartridge and, for an adjustment of water flow, is pivotable about a pivot axis running at right angles to the rotation axis, between an off setting, a maximum setting and an economy setting between the off setting and the maximum setting;
   an actuating lever disposed on the control arm, the actuating lever rotating and pivoting the control arm; and
   a cap covering the recess and the cartridge, the cap limiting a pivot motion of the actuating lever, and thus of the control arm, wherein:
   the cap is arranged on the fitting housing so as to be rotatable solely about the rotation axis;
   the cap has a long-hole like passage having a step,
   the actuating lever, which is movable from a limit setting into a release setting, passes through the passage,
   when in the limit setting, the actuating lever can only pivot between the off setting and the economy setting because a pivot motion of the actuating lever is limited by the step; and
   when in the release setting, the actuating lever can pivot between the off setting and the maximum setting because the pivot motion of the actuating lever is unhindered by the step.

2. The sanitary fitting as claimed in claim 1, wherein the passage, measured in a peripheral direction, has in a first portion extending from an end assigned to the off setting up to the step a first, larger width than in a second portion extending from the step up to the other end assigned to the maximum setting.

3. The sanitary fitting as claimed in claim 2, wherein the actuating lever, in a region of the passage and measured in the peripheral direction, has in the limit setting a second lever width which is smaller than the first width of the passage in the first portion and larger than a second width in the second portion, and has in the release setting a first lever width which is smaller than the second width of the passage in the second portion.

4. The sanitary fitting as claimed in claim 3, wherein:
the actuating lever has an actuating rod, fixedly disposed on the control arm, and an actuating sleeve, sitting on said actuating rod and displaceable in a longitudinal direction of the actuating rod,
the actuating sleeve, in a portion intended to cooperate with the passage having an outer diameter corresponding to the second lever width, and
the actuating rod, at least in the region of the passage, having a diameter corresponding to the first lever width.

5. The sanitary fitting as claimed in claim 4, wherein, between the actuating rod and the actuating sleeve, a spring operates in order to subject the actuating rod and the actuating sleeve to a force directed in the direction of the passage.

6. The sanitary fitting as claimed in claim 5, wherein:
a portion of the actuating sleeve, which is intended to cooperate with the passage, is located at a cap-side sleeve end, and
the actuating sleeve, adjoining the portion, has an outer diameter that is larger than the first width of the passage in the first portion.

7. The sanitary fitting as claimed in claim 4, wherein a length of a portion of the actuating sleeve which is intended to cooperate with the passage, measured in a longitudinal direction of the actuating lever, corresponds at least approximately to a thickness of the wall of the cap beside the passage.

8. The sanitary fitting as claimed in claim 1, wherein the cap has a casing portion, which is at least approximately coaxial to the rotation axis and at least approximately circular-cylindrical and contains the passage.

9. The sanitary fitting as claimed in claim 1, wherein the cap has a seal having elastically deformable lips for closing off the passage.

* * * * *